(12) United States Patent
Tsao

(10) Patent No.: US 8,327,088 B2
(45) Date of Patent: Dec. 4, 2012

(54) ISOLATION-FREE IN-CIRCUIT PROGRAMMING SYSTEM

(75) Inventor: Chong-Yung Tsao, Taipei (TW)

(73) Assignee: Dediprog Technology Co., Ltd., Taipei (TW)

( * ) Notice: Subject to any disclaimer, the term of this patent is extended or adjusted under 35 U.S.C. 154(b) by 336 days.

(21) Appl. No.: 12/836,800

(22) Filed: Jul. 15, 2010

(65) Prior Publication Data

US 2012/0017051 A1 Jan. 19, 2012

(51) Int. Cl.
*G06F 12/00* (2006.01)
(52) U.S. Cl. .................. 711/154; 711/E12.001
(58) Field of Classification Search .......................... None
See application file for complete search history.

(56) References Cited

U.S. PATENT DOCUMENTS

| | | | | |
|---|---|---|---|---|
| 4,506,349 A * | 3/1985 | Mazin et al. | ............... | 365/156 |
| 6,357,013 B1 * | 3/2002 | Kelly et al. | ............... | 713/324 |
| 2007/0053228 A1 * | 3/2007 | Nam et al. | ............... | 365/189.09 |
| 2008/0077816 A1 * | 3/2008 | Ravichandran | ............... | 713/324 |
| 2008/0290935 A1 * | 11/2008 | Yang et al. | ............... | 327/544 |
| 2009/0261884 A1 * | 10/2009 | Kim | ............... | 327/333 |
| 2010/0123513 A1 * | 5/2010 | Kang | ............... | 327/538 |

* cited by examiner

*Primary Examiner* — Edward Dudek, Jr.
*Assistant Examiner* — Ralph A Verderamo, III
(74) *Attorney, Agent, or Firm* — Kirton McConkie; Evan R. Witt

(57) ABSTRACT

Disclosed is an isolation-free in-circuit programming system including an in-circuit programmer and an application board connected to the in-circuit programmer through a peripheral interface bus and having a bus controller and a memory, wherein the bus controller is connected to the memory through a system bus, in which the in-circuit programmer includes a leakage current discharging circuit connected to the bus controller for detouring a leakage current flowing from the memory or the in-circuit programmer to the bus controller to flow therethrough. The in-circuit programmer also includes an input level shifter for receiving data signals from the memory and adjusting the high-level input voltage of the in-circuit programmer to decode any weak high-level output voltage from the memory, thereby allowing the high-level output voltage of the memory to be higher than the high-level input voltage of the in-circuit programmer.

10 Claims, 9 Drawing Sheets

US 8,327,088 B2

ISOLATION-FREE IN-CIRCUIT PROGRAMMING SYSTEM

FIELD OF THE INVENTION

The invention is related to an in-circuit programmer, and more particularly to an isolation-free in-circuit programming system.

BACKGROUND OF THE INVENTION

Typically, memory device is used to store firmware instruction codes that are provided for microprocessors or microcontrollers to execute. When a memory stored with firmware instruction codes is securely mounted on or soldered on an application-specific circuit board or a computer mainboard and is required to be updated, the user tends to perform firmware update operation to the memory without the requirement of removing the memory from its carrier or unsoldering the memory. Therefore, in-circuit programmers are proposed to allow technicians to perform firmware update operations to memory directly in the circuit or system, and have been widely employed.

FIG. 1 is a system block diagram of a conventional in-circuit programming system. As shown in FIG. 1, the in-circuit programming system includes an in-circuit programmer 100 which includes a serial communication interface 160, such as USB interface for receiving firmware instruction codes from a host computer (not shown). The in-circuit programmer 100 further includes a microcontroller 104 for parsing the firmware instruction codes, verifying the content of the firmware instruction codes, and translating the firmware instruction codes into data signals for being programmed into the memory 124. The data signals to be programmed will be transmitted to the output buffer 102 with higher driving capability such that the output buffer 102 can output data signals to a peripheral interface bus 130 when the in-circuit programmer 100 is allowed to program the memory 124. The in-circuit programmer 100 is connected to an application board 120 through a wired peripheral interface bus 130. The application board 120 may be a computer mainboard, and the peripheral interface bus 130 may be a serial (SPI, Microwire etc) or parallel interface bus according to the memory 124 used. The application board 120 includes a bus controller 140 and a memory 124 mounted thereon. The bus controller 140 is configured to access the memory 124 through a system bus 135 in order to fetch the application code and make it run during application life.

FIG. 2 is a system block diagram of a conventional in-circuit programming system for depicting the programming operation when the application board is powered off. It is to be noted that similar circuit elements are labeled with the same reference numerals throughout the entire specification. As shown in FIG. 2, a first RC filter bank 202 is disposed in the in-circuit programmer 100 and connected between the output buffer 102 and an I/O pin 1241 of the memory 124 through node A for removing the noise from the signals outputted from the output buffer 102 and protecting the in-circuit programmer 100 from being short-circuited. Also, a second RC filter bank 204 is disposed in the system bus 135 and connected between the I/O pin 1241 of the memory 124 and an I/O pin 1401 of the bus controller 140 for removing the noise from the signals transmitted on the system bus 135 when the application board 120 is running. As the application board 120 is powered off, the system bus 135 is dedicatedly to be used by the in-circuit programmer 100. Under this condition, the in-circuit programmer 100 must provide an applied voltage $V_{cc1}$ to power the memory 124 on the application board 120 for programming. The power provided from the in-circuit programmer 100 is usually isolated from the rest of the application board 120 by using a Diode or MOSFET between the rest components and the memory 124 so that the in-circuit programmer 100 does not supply power to all components of the application board 120. It has to be noted that in order to ensure reliable communication, the high-level output voltages (signals) ($V_{oh}$) from the in-circuit programmer 100 or from the memory 124 must always be higher than the high-level input voltages (signals) ($V_{ih}$) of the memory 124 or the in-circuit programmer 100, which is necessary to switch the signal-receiving device to a high state. The voltage level of the high-level output signals ($V_{oh}$) of the signal-transmitting device will depend on the capability of the buffer (for example the output buffer 102a or the buffer of the memory 124) to drive the output to the power supply level of the signal-receiving device under some current conditions. The voltage level of the high-level input signals ($V_{ih}$) will depend on the power supply level and input trigger of the signal-receiving device (usually, $V_{ih}=V_{cc1}*0.7V$ on CMOS compatible device). The output buffer 102a of the in-circuit programmer 100 is configured to provide data signals for being written into the memory 124 with a minimum high-level output voltage of the data signal higher than the high-level output voltage $V_{oh}$ to be decoded by the memory 124 during the memory writing process. The in-circuit programmer 100 further includes an input buffer 102b for receiving data signals from the output of the memory 124 during the memory reading process. The high-level output signals ($V_{oh}$) of the in-circuit programmer 100 must always be higher than the high-level input signals ($V_{ih}$) of the memory 124, and the high-level output signals ($V_{oh}$) of the memory 124 must always been higher than the high-level input signals ($V_{ih}$) of the in-circuit programmer 100. Electrostatic discharge diodes (ESD diodes) $D_{21}$ and $D_{22}$ are designed in the bus controller 140 to protect the input buffer and the output buffer (not shown in FIG. 2) of the bus controller 140 from being damaged by electrostatic charges. When the in-circuit programmer 100 or the memory 124 drives the signals transmitted on the system bus 135 to a high state, a considerable leakage current $I_1$ will be discharged through the bus controller 140, thereby lowering the high-level output voltage $V_{oh}$. When the application board 120 is powered off and assume that applied voltage $V_{cc1}$ supplied by the in-circuit programmer 100 to the output buffer 102a and the memory 124 mounted on the application board 120 is 3.3V, and the resistance of the second RC filter bank 204 between the bus controller 140 and the memory 124 is 33Ω, the high-level input voltage $V_{ih}$ of the memory 124 is $V_{cc1} \times 0.7 = 3.3 \times 0.7 = 2.31V$. Therefore, the high-level output voltage $V_{oh}$ of the output buffer 102a of the in-circuit programmer 100 must be higher than 2.31V, thereby making the minimum of the leakage current $I_1$ to be $(2.3-0.7)/33=50$ mA, where the 0.7V is the turn-on voltage of the ESD diodes $D_{21}$ and $D_{22}$. Under this condition, the higher the applied voltage $V_{cc1}$ supplied to the internal output buffer 102a and the memory 124 stands, the higher the high-level input voltage $V_{ih}$ of the memory 124 will be. Thus, the high-level output voltage $V_{oh}$ for the in-circuit programmer 100 must increase as well, thereby boosting the leakage current. In the same way, during the reading process, the input buffer 102a of the in-circuit programmer 100 is supplied by $V_{cc1}$ and needs a minimum high-level output voltage of signals from the memory 124 higher than the high-level input voltage $V_{ih}=3.3 \times 0.7=2.31V$. Because the driving capability of the buffer (not shown) of the memory 124 is typically weak and can not provide a high-level output voltage as high as 2.31V under high current leakage condition, the communication between the in-circuit programmer 100 and the memory 124 would be failed frequently (the high-level output voltage $V_{oh}$ of the memory 124 smaller than the high-level input voltage $V_{ih}$ of the in-circuit programmer 100). Also, the leakage current $I_1$ injecting into the bus controller 140 will damage the bus controller 140, thereby causing inconvenience in circuit design and inflicting perilous danger in use.

FIG. 3 is a system block diagram of a conventional in-circuit programming system for depicting the programming operation when the application board is powered on. As shown in FIG. 3, when the application is powered on, the memory 124 is power-supplied by the application board 120. The in-circuit programmer 100 will issue a reset signal Sr to the bus controller 140 to stop the communication between the bus controller 140 and the memory 124 and fix the I/O pins of the bus controller 140 to a known and stable state. Under the reset state, the I/O pin 1401 of the bus controller 140 will be driven either to a High Impedance (not driven or floating) or Low Impedance (driven Low or driven High) according to the controller design. If the I/O pin 1401 of the bus controller 140 is switched in high impedance, then the in-circuit programmer 100 and the memory 124 can communicate safely without any possible conflict. However, the I/O pin 1401 of the bus controller 140 is more often driven in Low Impedance to reduce consumption or noise. Therefore, the system bus signals of the I/O pin 1401 of the bus controller 140 will be selectively driven High or Low by the bus controller 140. The output buffer 102a of the in-circuit programmer 100 is configured to provide data signals for being written into the memory 124 and a high-level output voltage $V_{oh}$ or low-level output voltage $V_{ol}$ for the memory 124 during the memory writing process. The input buffer 102b is used for receiving data signals from the memory 124 with a high-level input voltage $V_{ih}$ and low-level input voltage $V_{il}$ requirements during the memory reading process. When the I/O pin of the memory 124 or the in-circuit programmer 100 outputs a high-level output signal $V_{oh}$ at the node A and the I/O pin 1401 of the bus controller 140 outputs a low-level output signal, a large leakage current $I_1$ is induced and flow through the second RC filter bank 204 and injects into the bus controller 140. When the I/O pin of the memory 124 or the in-circuit programmer 100 outputs a low-level output signal at the node A and the I/O pin 1401 of the bus controller 140 outputs a high-level output signal, the leakage current $I_1$ is induced and flow through the second RC filter bank 204 and injects into the in-circuit programmer 100 or the memory 124. Like the example of FIG. 2, the example of FIG. 3 is bound to suffer the deficiencies of FIG. 2 that the buffer of the memory 124 is weak in driving capability to cause communication failure between the in-circuit programmer 100 and the memory 124, and the risk that the leakage current $I_1$ will inject into the bus controller 140 to damage the bus controller 140.

FIG. 4 is a system block diagram of a conventional in-circuit programming system with isolation. In order to prevent the leakage current $I_1$ to be injected into the bus controller 140, an isolation circuit 402 is placed on the system bus 135. The isolation circuit 402 is made up of a MOSFET or switch and is configured to isolate the bus controller 140 from the memory 124 and the in-circuit programmer 100. Also, the isolation circuit 402 is switched to the OPEN state, thereby eliminating leakage current $I_1$. Under this condition, the system bus 135 is driven to a high-impedance state on the memory and programmer side. Although the in-circuit programming system with isolation as shown in FIG. 4 is able to efficiently eliminate the leakage current and ensure a good communication between the in-circuit programmer 100 and memory 124, the manufacturing cost of the application board 120 will greatly increase.

It is required to develop an isolation-free in-circuit programming system that can eliminate the leakage current without an isolation circuit mounted on the application board and lower the requirement of the high-level input voltage of the memory to improve reliability. The invention can address these needs.

SUMMARY OF THE INVENTION

It is therefore an object of the invention to provide an in-circuit programming system without an isolation circuit mounted on the application board to provide high impedance on the system bus and eliminate the leakage current in the bus controller.

It is another object of the invention to provide an in-circuit programming system having a in-circuit programmer with an internal input level shifter for tuning the high-level input voltage requirements of the in-circuit programmer to decode even weak high-level output voltage of the memory, thereby ensuring a reliable and efficient communication from memory to in-circuit programmer.

It is another object of the invention to provide an in-circuit programming system having a in-circuit programmer with strongest programmer buffer for ensuring high-level output voltage even under high current leakage so that the memory can be supplied with the highest power for the programming.

In accordance with one aspect of the present invention, an isolation-free in-circuit programming system is provided. The system comprises an in-circuit programmer; and an application board connected to the in-circuit programmer through a peripheral interface bus and having a bus controller and a memory, wherein the bus controller is connected to the memory through a system bus. The in-circuit programmer includes a leakage current discharging circuit connected to the bus controller for detouring a leakage current flowing from the memory or the in-circuit programmer to the bus controller to flow therethrough.

In an embodiment, the in-circuit programmer further includes an output buffer for outputting data signals to be written into the memory, and the output buffer possesses a driving capability sufficient to drive the in-circuit programmer to accomplish writing operations to the memory and the leakage current flows from the output buffer of the in-circuit programmer to the leakage current discharging circuit.

In an embodiment, the in-circuit programmer further includes an input level shifter for receiving data signals from the memory, and wherein the input level shifter is configured to adjust the high-level input voltage requirements of the in-circuit programmer to decode a relatively weak high-level output voltage of the memory.

In an embodiment, the in-circuit programmer further comprises a microcontroller configured to adjust a memory power supply to optimize a high-level input voltage requirement of the memory and a high-level output voltage of the memory.

In an embodiment, the in-circuit programmer further comprises at least one analog-to-digital converter for measuring the magnitude of a high-level output voltage of the in-circuit programmer or the memory, and the microcontroller is configured to adjust the memory power supply to optimize the high-level input voltage requirement of the memory and the high-level output voltage of the memory according to the measured results of the analog-to-digital converter.

In an embodiment, the in-circuit programmer further comprises at least one analog-to-digital converter for measuring the magnitude of a high-level output voltage of the in-circuit programmer or the memory, and the microcontroller is configured to adjust the high-level input voltage requirement of the in-circuit programmer according to the measured results of the analog-to-digital converter.

In an embodiment, the in-circuit programmer further comprises at least one analog-to-digital converter for measuring the magnitude of an voltage on an I/O pin of the bus controller, and the microcontroller is configured to control a switching operation of the leakage current discharging circuit.

However, it is to be noted that each signal line of the peripheral interface bus must be provided with an analog-to-digital converter to measure the magnitude of voltage on the signal line or the signal intensity of the signal transmitted on the signal line.

In an embodiment, the leakage current discharging circuit includes a first switch connected between an I/O pin of the bus controller and an in-circuit programmer ground, and when the first switch is turned on, the leakage current passes through the first switch.

In an embodiment, the leakage current discharging circuit further comprises a second switch connected to the first switch, and when the second switch is turned on, the leakage current passes through the second switch.

In accordance with one aspect of the present invention, an isolation-free in-circuit programmer is provided. The isolation-free in-circuit programmer is connected to an application board through a peripheral interface bus, wherein the application board has a bus controller and a memory and the bus controller is connected to the memory through a system bus. The in-circuit programmer comprises a microcontroller configured to adjust a memory power supply $V_{cc1}$ to optimize a high-level input voltage requirement of the memory of the application board and a high-level output voltage of the memory of the application board, adjust the applied power $V_{cc2}$ to the output buffer of the in-circuit programmer to optimize the high-level output voltage of the programmer, adjust the applied voltage $V_{cc3}$ to the input level shifter to optimize the high-level input voltage of the programmer, and adjust the applied voltage $V_{cc4}$ to the MOSFET switch within a leakage current discharge circuit to optimize the current discharge. The programmer further includes a leakage current discharging circuit controlled by the microcontroller and connected to the bus controller of the application board for detouring a leakage current flowing from the memory of the application board or the in-circuit programmer to the bus controller of the application board to flow therethrough.

Now the foregoing and other features and advantages of the present invention will be best understood through the following descriptions with reference to the accompanying drawings, wherein:

BRIEF DESCRIPTION OF THE DRAWINGS

FIG. 3 is a system block diagram of a conventional in-circuit programming system for depicting the programming operation when the application board is powered on;

FIG. 9 is a system block diagram of the inventive in-circuit programming system for depicting the programming operation when the application board is powered on.

DETAILED DESCRIPTION OF THE PREFERRED EMBODIMENT

Several preferred embodiments embodying the features and advantages of the invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as limitative.

Figure 5:
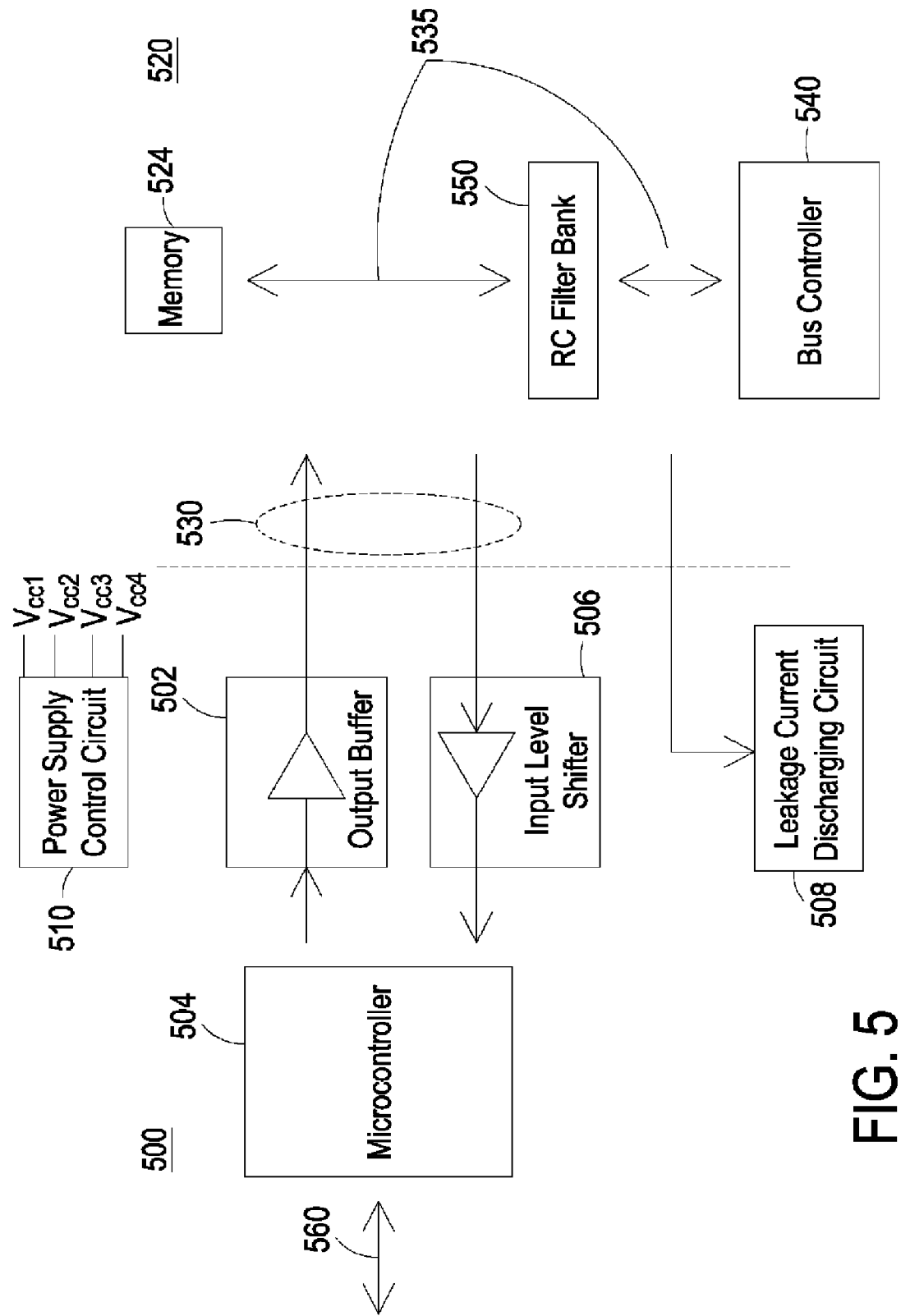
FIG. 5 is a system block diagram of the inventive in-circuit programming system.

FIG. 5 is a system block diagram of the inventive in-circuit programming system. As shown in FIG. 5, the inventive in-circuit programming system includes an in-circuit programmer 500 and an application board 520. The in-circuit programmer 500 includes a serial communication interface 560, such as USB interface for receiving firmware instruction codes from a host computer (not shown). The in-circuit programmer 500 further includes a microcontroller 504 for parsing the firmware instruction codes, verifying the content of the firmware instruction codes, and translating the firmware instruction codes into data signals for being programmed into the memory 524. The data signals to be programmed will be transmitted to an output buffer 502 with higher driving capability such that the output buffer 502 can output data to a peripheral interface bus 530 when the in-circuit programmer 500 is allowed to program the memory 524. The in-circuit programmer 500 is connected to the application board 520 through a wired serial peripheral interface bus 530. The application board 520 may be a computer mainboard, and the peripheral interface bus 530 may be a SPI, Microwire or any interface. The application board 520 includes a bus controller 540 and a memory 524 mounted thereon. The bus controller 540 is configured to access the memory 524 through a system bus 535. It is to be noted that a RC filter bank 550 is placed on the system bus 530 between the bus controller 540 and the memory 524 for removing noises from signals transmitted on the system bus 535 when the application board 520 is running.

Figure 1:
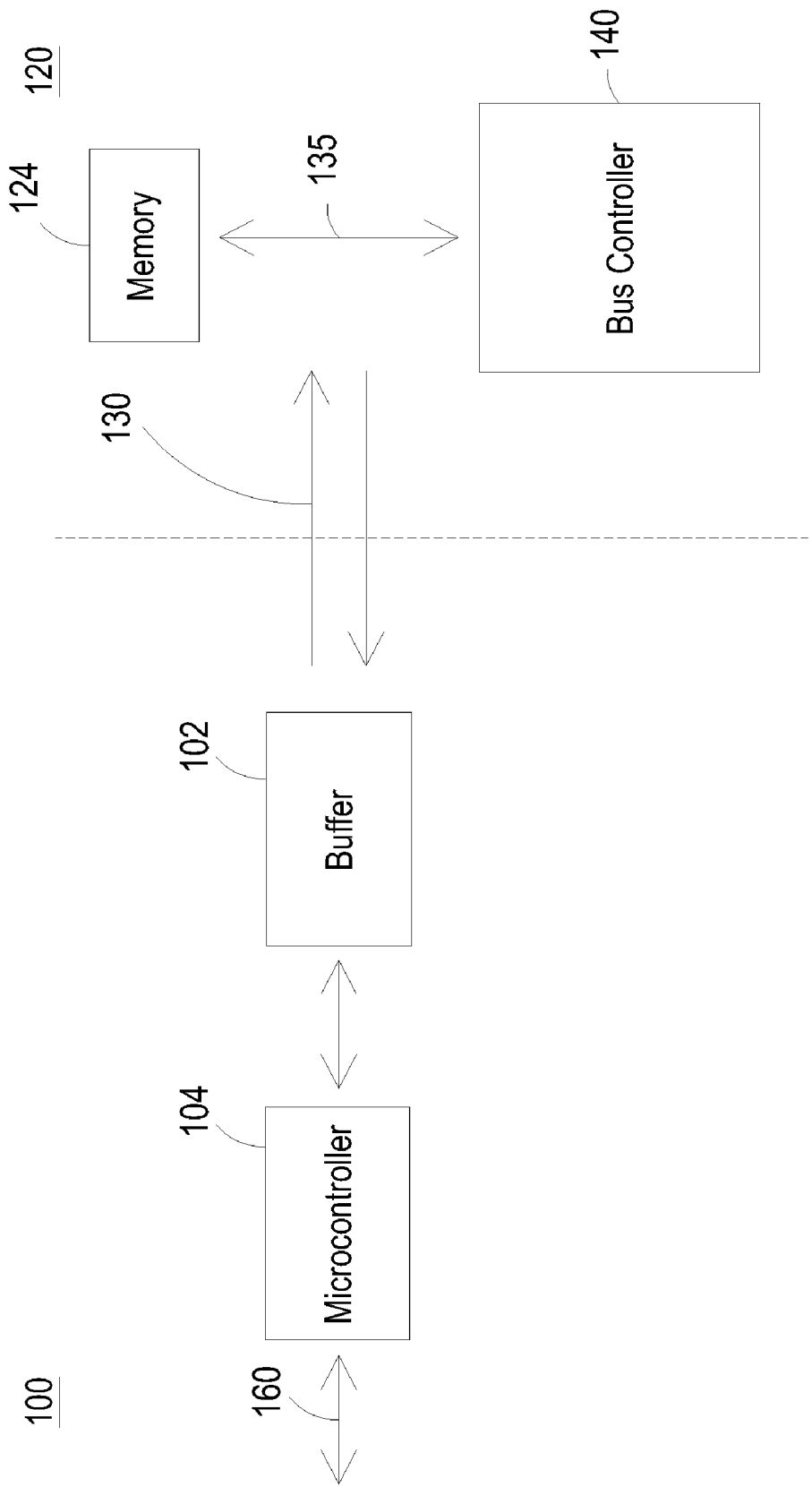
FIG. 1 is a system block diagram of a conventional in-circuit programming system.
Figure 2:
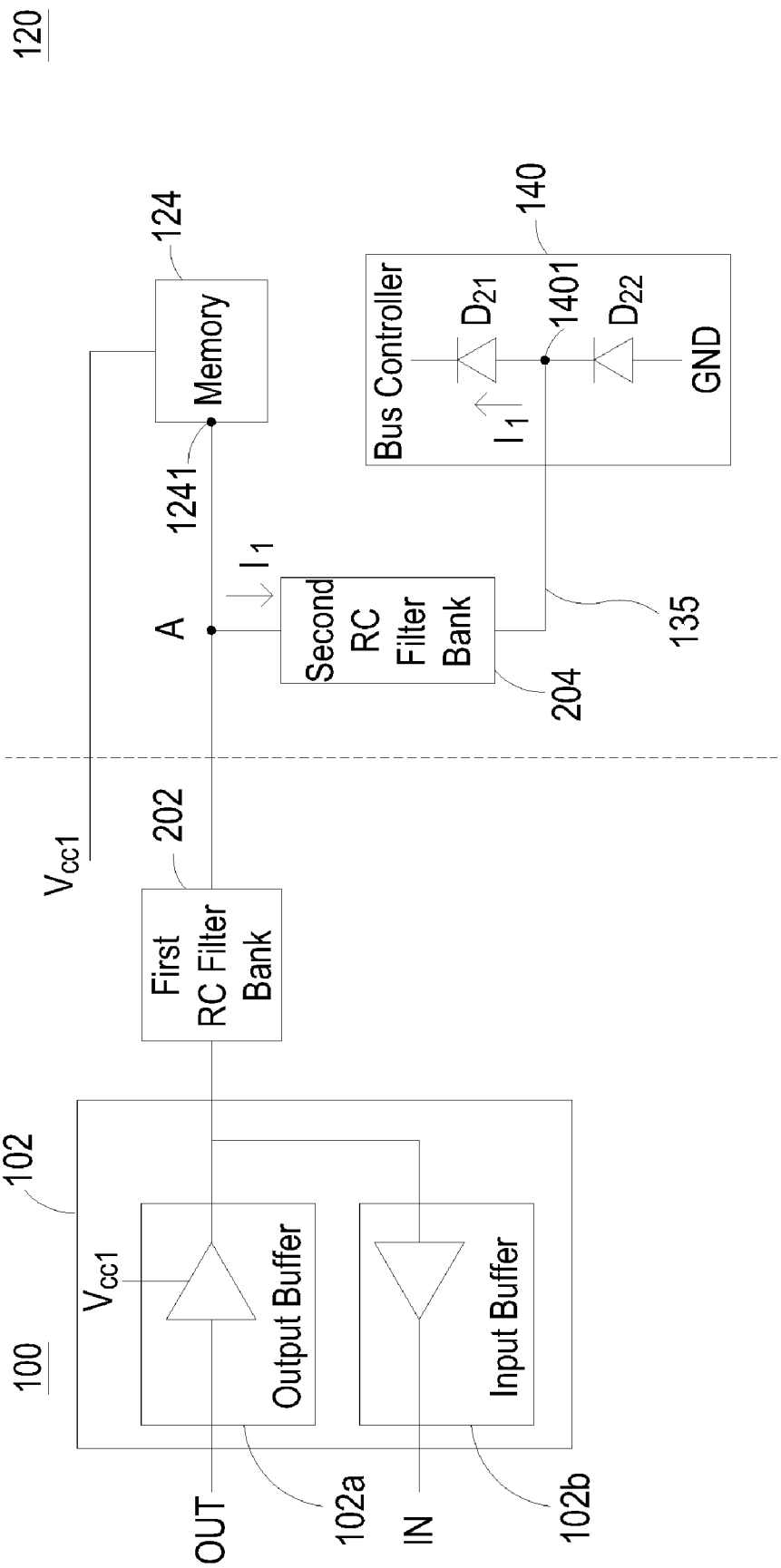
FIG. 2 is a system block diagram of a conventional in-circuit programming system for depicting the programming operation when the application board is powered off.
Figure 3:
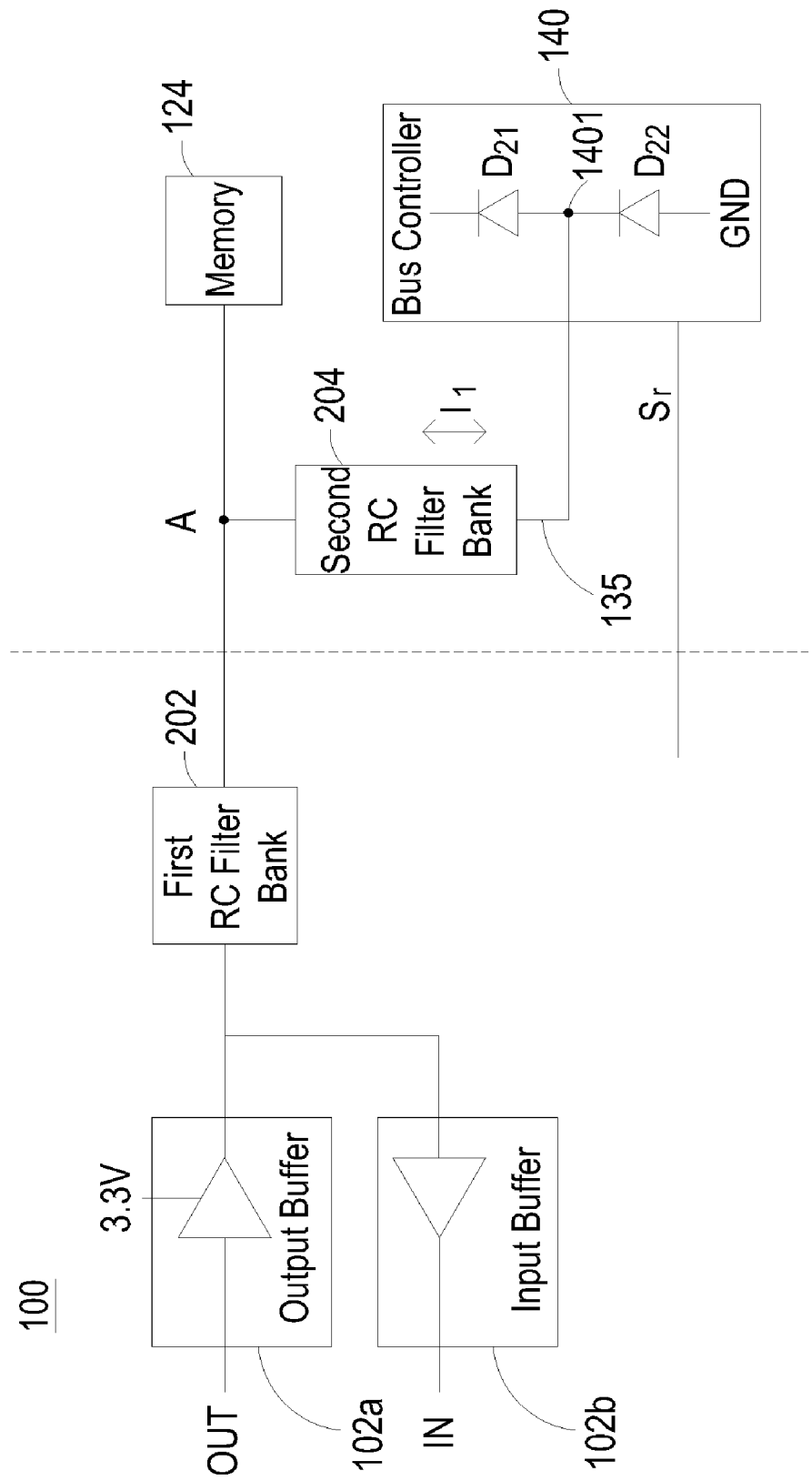
Figure 4:
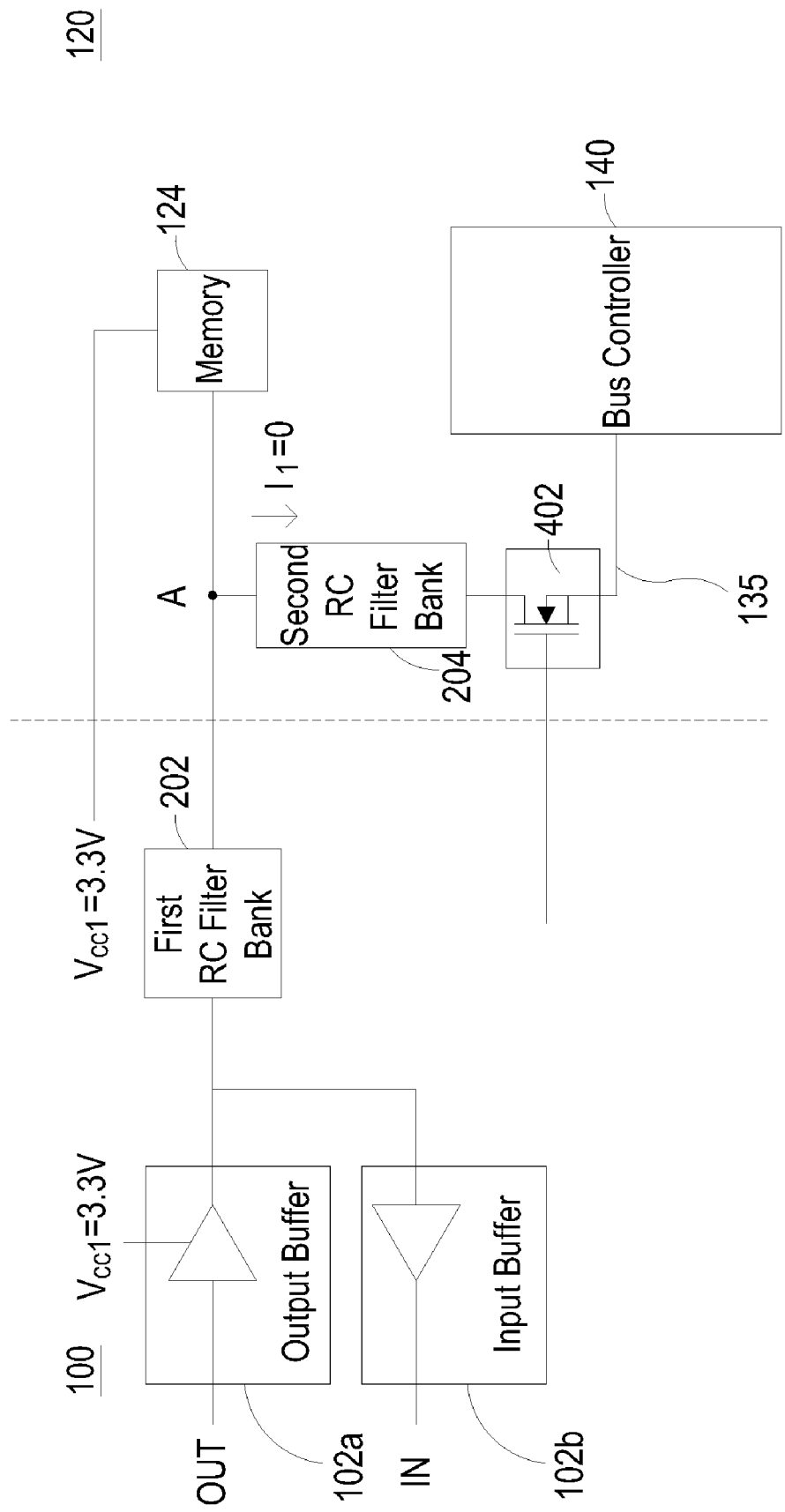
FIG. 4 is a system block diagram of a conventional in-circuit programming system with isolation.

Compared with the system block diagram of FIG. 4, it is noteworthy that the system of FIG. 5 eliminates the isolation circuit 402 of FIG. 4. Instead, the system of FIG. 5 includes a leakage current discharging circuit 508 disposed in the in-circuit programmer 500. The leakage current discharging circuit 508 is made up of MOSFET switches to detour the leakage current intended to be injected into the bus controller 540 to the leakage current discharging circuit 508, such that the leakage current can be discharged through the leakage current discharging circuit 508 in the in-circuit programmer 500 instead of being discharged through the ESD diodes (not shown) during application board 520 power off or in the output buffer of the bus controller 540, which is driven High or Low by the bus controller 540, during the application board 520 power on. Furthermore, in order to enhance the driving capability of the output buffer 502 of the in-circuit programmer 500, the output buffer 502 is selected to possess a strong driving capability to ensure a high-level output voltage $V_{oh}$ of the in-circuit programmer 500 during the memory writing process. In addition, the input buffer 102b of FIG. 4 is replaced with an input level shifter 506 to reduce the high-level input voltage $V_{ih}$ requirements of the in-circuit programmer 500 and decode even a weak high-level output voltage ($V_{oh}$) from the memory 524. Thereby, it is ensured that the high-level input voltage $V_{ih}$ of the in-circuit programmer 500 is always smaller than the high-level output voltage $V_{oh}$ of the memory 524. Finally, when the application board 520 is powered off, the applied voltage (not shown in FIG. 5) supplied from the in-circuit programmer 500 to the memory 524 is regulated such that the high-level input voltage $V_{ih}$ requirements of the memory 524 is always smaller than the high-level output voltage ($V_{oh}$) of the in-circuit programmer 500. The combination of the in-circuit programmer 500 strong buffer, in-circuit programmer $V_{ih}$ control, memory $V_{ih}$ control and current leakage discharge eliminate the need of isolation in the application boards. In addition, the programmer 500 includes a power supply control circuit 510 configured for supplying applied voltages ($V_{cc1}$-$V_{cc4}$) to memory 524, output buffer 502, input level shifter 506, and the leakage current discharging circuit 508, respectively. The detailed circuitry and operations of the in-circuit programming system will be described in more detail as follows.

Figure 6:
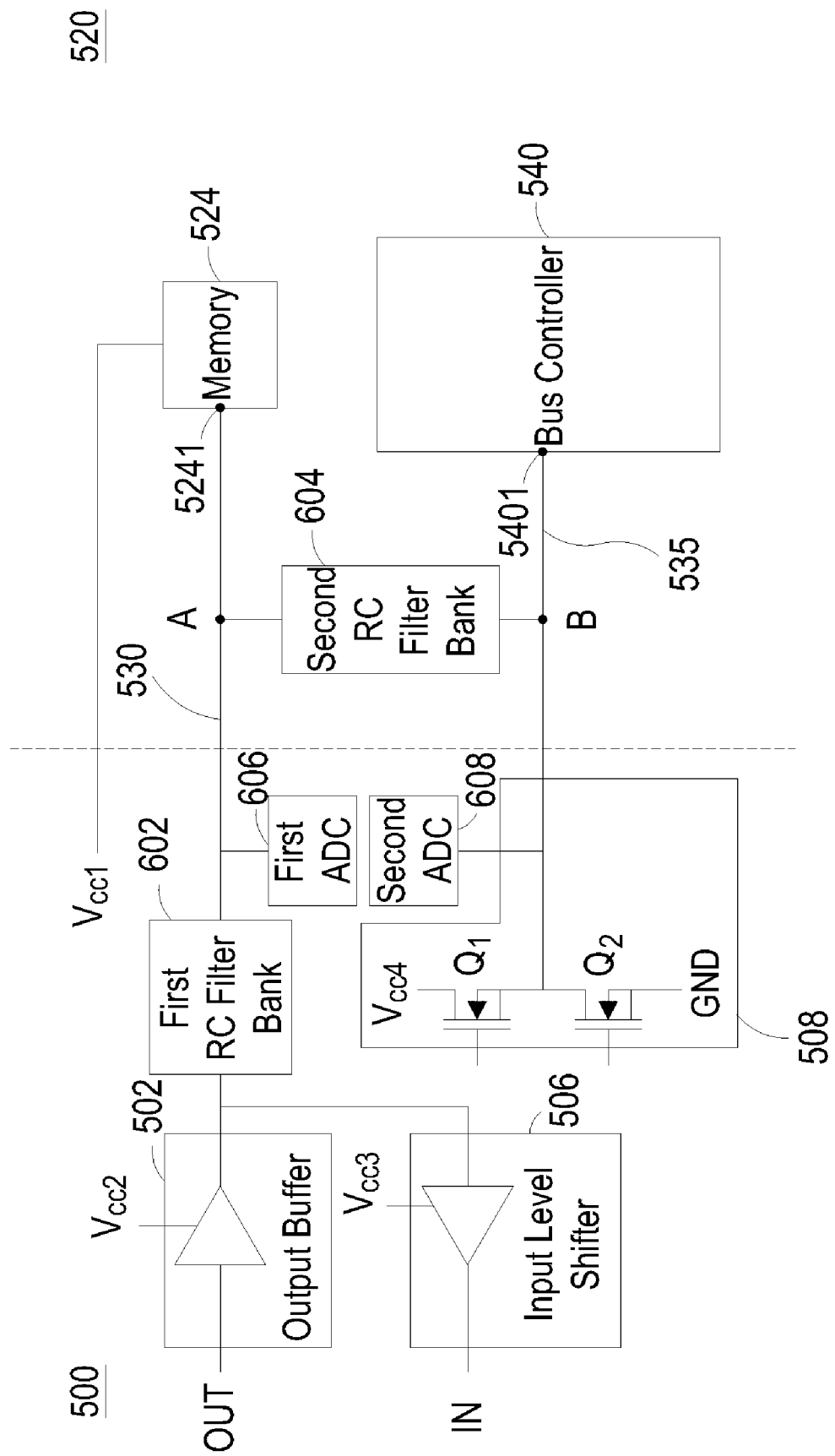
FIG. 6 is a system block diagram showing the detailed circuitry of the inventive in-circuit programming system.

FIG. 6 is a system block diagram showing the detailed circuitry of the inventive in-circuit programming system. It is to be noted that similar circuit elements are labeled with the same reference numerals throughout the entire specification. As shown in FIG. 6, the applied voltage for the memory 524 is designated as a first applied voltage $V_{cc1}$, the applied voltage for the output buffer 502 of the in-circuit programmer 500 is designated as a second applied voltage $V_{cc2}$, and the applied voltage for the input level shifter 506 of the in-circuit programmer 500 is designated as a third applied voltage $V_{cc3}$, and the applied voltage for the MOSFET Q2 of the leakage current discharging circuit 508 of the in-circuit programmer 500 is designated as a fourth applied voltage $V_{cc4}$. The in-circuit programmer 500 includes an output buffer 502 for outputting data signals for being written to the memory 524 on the application board 520 through the peripheral interface bus 530. The bus controller 540 controls the access of the memory 524 through the system bus 535. In addition, the in-circuit programmer 500 further includes a first RC filter bank 602 connected between the output buffer 502 and an I/O pin 5241 of the memory 524 through node A for removing noise from the data signals outputted from the output buffer 502 and protecting the output buffer 502 from being short-circuited, and a first analog-to-digital converter 606 (i.e. first ADC) for measuring the magnitude of the high-level output voltage $V_{oh}$ of the in-circuit programmer 500 to fine adjust the high-level input voltage $V_{ih}$ requirements of the I/O pin 5241 of the memory 524 or for measuring the magnitude of the high-level ouput voltage $V_{oh}$ of the memory 524 to fine adjust the high level input voltage $V_{ih}$ requirements of the in-circuit programmer 500 and a second analog-to-digital converter 608 (i.e. second ADC) for measuring the magnitude of the voltage on the I/O pin 5401 of the bus controller 540 and select the current discharge method by selecting the MOSFET switches $Q_1$, $Q_2$ of the leakage current discharging circuit 508 (MOSFET selection). However, it is to be noted that each signal line of the peripheral interface bus 530 must be provided with an analog-to-digital converter to measure the magnitude of voltage on the signal line or the signal intensity of the signal transmitted on the signal line.

In addition, a second RC filter bank 604 is disposed between the I/O pin 5241 of the memory 524 through node A and the I/O pin 5401 of the bus controller 540 through node B for removing noise from the data signal transmitted on the system bus 535. Remarkably, a leakage current discharging circuit 508 is disposed in the in-circuit programmer 500 and connected to the second RC filter bank 604 and the I/O pin 5401 of the bus controller 540 through node B. The leakage current discharging circuit 508 includes MOSFET switches $Q_1$, $Q_2$ to allow the leakage current to be delivered to the in-circuit programmer Ground (GND) or in-circuit programmer power ($V_{cc4}$). The switches $Q_1$ and $Q_2$ are connected in series with each other, in which the source terminal of the second switch $Q_2$ is connected to the ground and the drain terminal of the second switch $Q_2$ is connected to the node B and the source terminal of the first switch $Q_1$. The drain terminal of the first switch $Q_1$ is connected to a fourth applied voltage $V_{cc4}$. According to the measurements by the second ADC 608, the second switch $Q_2$ will be turned on (connected to the in-circuit programmer Ground (GND)) by the microcontroller (not shown) to allow the leakage current to pass therethrough (second switch $Q_2$) when application board is power off or when application board is power on and the I/O pins of the bus controller 540 are driven low by bus controller 540. According to the measurements by the second ADC 608, the first switch $Q_1$ will be turned on (connected to the in-circuit programmer power ($V_{cc4}$)) by the microcontroller (not shown) when application board is power on and the I/O pins of the bus controller 540 are driven high by bus controller 540. In this way, the bus controller 540 can be protected without incurring damages from the leakage current $I_1$. In addition, the input buffer 102b of FIG. 4 is replaced with an input level shifter 506 to reduce the high-level input voltage $V_{ih}$ requirements of the in-circuit programmer 500 and decode even a weak high-level output voltage ($V_{oh}$) from the memory 524. Thereby, it is ensured that the high-level input voltage $V_{ih}$ of the in-circuit programmer 500 is always smaller than the high-level output voltage ($V_{oh}$) of the memory 524. Finally, the applied voltage $V_{cc1}$ supplied from the in-circuit programmer 500 to the memory 524 is regulated according to the readings of the first ADC 606 such that the high-level input voltage $V_{ih}$ of the memory 524 is always smaller than the high-level output voltage ($V_{oh}$) of the in-circuit programmer 500. The combination of the programmer strong buffer, the in-circuit programmer $V_{ih}$ control, the memory $V_{ih}$ control and the current leakage discharge eliminate the need of isolation in the application boards.

Figure 7:
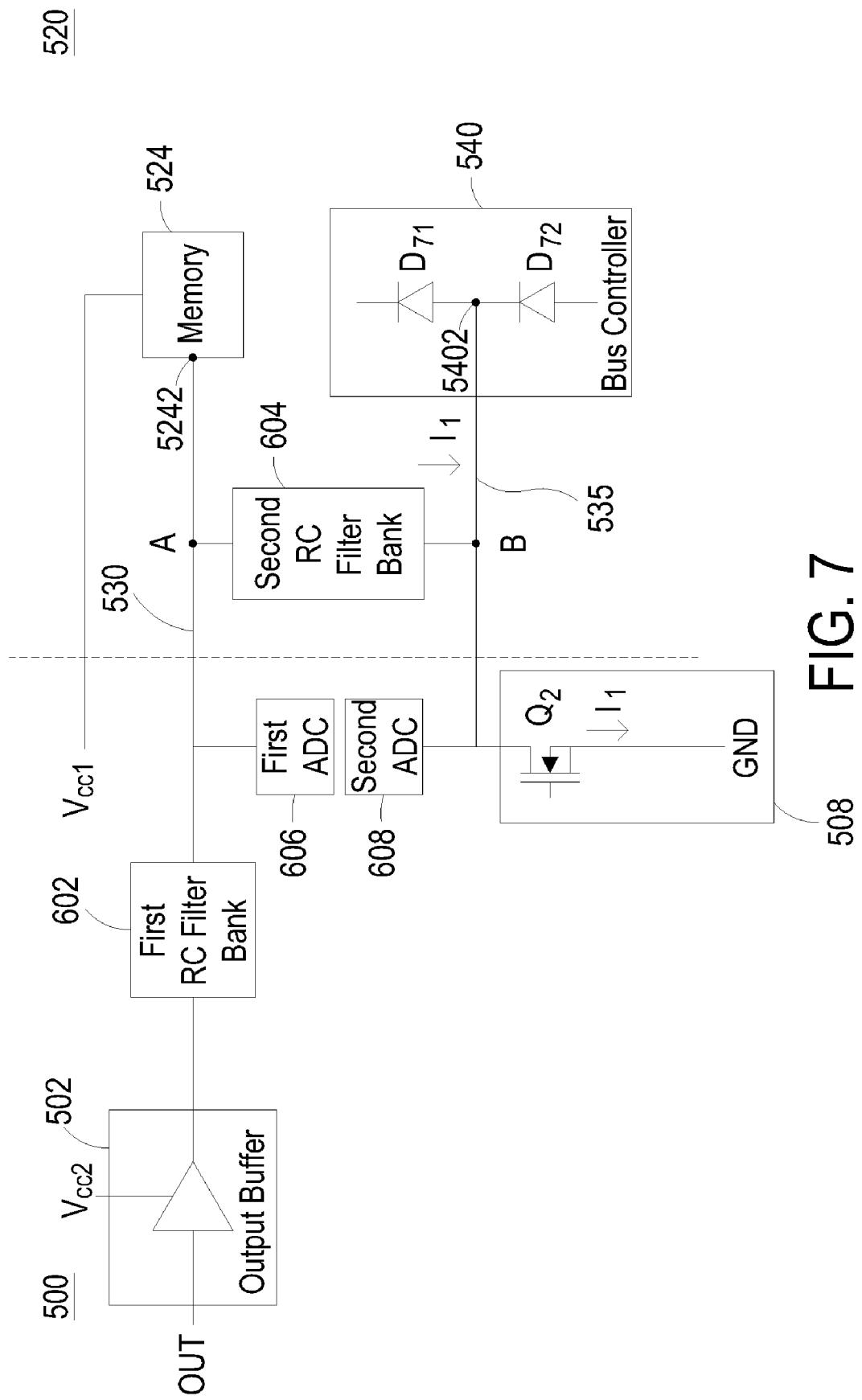
FIG. 7 is a system block diagram of the inventive in-circuit programming system for depicting the memory writing operation when the application board is powered off.

FIG. 7 is a system block diagram of the inventive in-circuit programming system for depicting the memory writing operation when the application board is powered off. As shown in FIG. 7, the first RC filter bank 602 is connected to an input pin 5242 of the memory 524. The first applied voltage $V_{cc1}$ applied to the memory 524 is selected to be a minimum voltage allowable to power the memory 524, for example, 2.7V. Thus, the high-level input voltage requirements $V_{ih}$ for the memory 524 is $V_{cc1} \times 0.7 = 2.7 \times 0.7 = 1.89V$. In this way, the high-level input voltage $V_{ih}$ of the memory 524 is lowered so that the memory 524 can decode even weak high-level output voltage $V_{oh}$ from the in-circuit programmer 500. Also by configuring the output buffer 502 with a strong driving capability, the output buffer 502 can output a high-level output voltage $V_{oh}$ higher than 1.89V despite the leakage current. By using the first ADC 606 on the node A, the in-circuit programmer 500 can verify real voltage level of the high-level output voltage $V_{oh}$ of the in-circuit programmer 500. If the high-level output voltage $V_{oh}$ of the in-circuit programmer 500 is much higher than the high-level input voltage $V_{ih}$ of the memory 524, then the in-circuit programmer 500 can increase the memory power supply $V_{cc1}$ for a better internal programming and a better anti-noise ability. If the high-level output voltage $V_{oh}$ of the in-circuit programmer 500 is smaller than the high-level input voltage $V_{ih}$ of the memory 524, then the in-circuit programmer 500 can increase the power supply $V_{cc2}$ for the output buffer 502 to increase the voltage level of the high-level output voltage $V_{oh}$ of the in-circuit programmer 500 or decrease the voltage level of the high-level input voltage $V_{ih}$ requirements of the memory 524 if $V_{cc1}$ is not at the minimum. To prevent current leakage through the ESD Diode $D_{71}$, the microcontroller of the in-circuit programmer 500 will turn on the switch $Q_2$ to let the Node B at 0V and all the leakage current $I_1$ will be delivered to the in-circuit programmer Ground through the switch $Q_2$. Hence, the leakage current $I_1$ will be detoured to flow through the leakage current discharging circuit 508 instead of the ESD diodes $D_{71}$ thereby protecting the bus controller 540 from being damaged by the leakage current $I_1$. Suppose the resistance of the first RC filter bank 602 is 50Ω, the resistance of the second RC filter bank 604 is 33Ω, the high-level output voltage $V_{oh}$ of the in-circuit programmer 500 is 2V and the Vcc1 is 2.7V, so the high-level input voltage $V_{ih}$ of the memory 524 is 1.89V. The leakage current $I_1$ will be 2/33=60 mA, and the second applied voltage $V_{cc2}$ will be 2V+60 mA×50Ω=5V. Also the input level shifter 506 of the in-circuit programmer 500 is not shown in FIG. 7 for simplicity.

Figure 8:
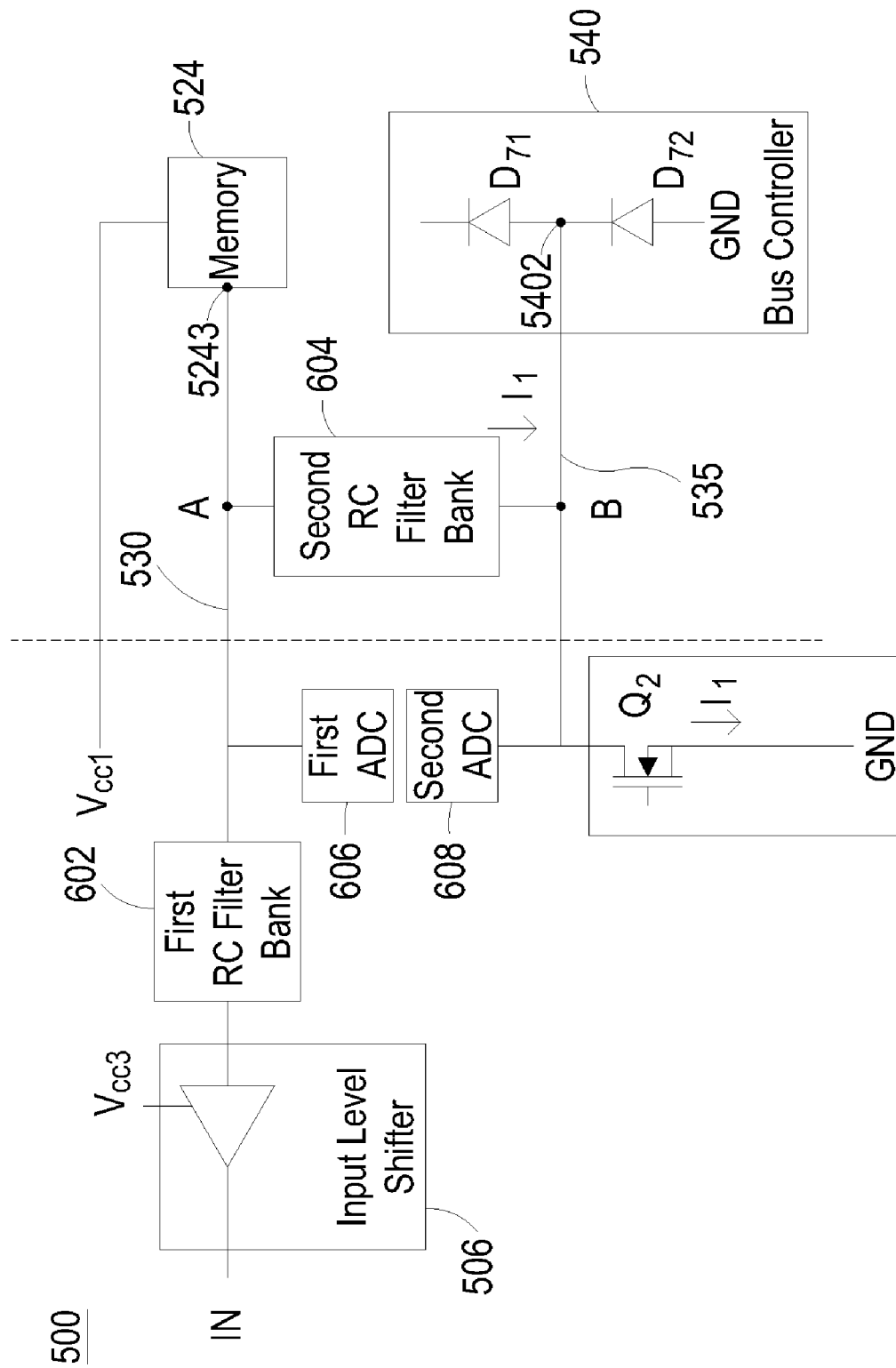
FIG. 8 is a system block diagram of the inventive in-circuit programming system for depicting the memory reading operation when the application board is powered off.

FIG. 8 is a system block diagram of the inventive in-circuit programming system for depicting the memory reading operation when the application board is powered off. The first RC filter bank 602 is connected to an output pin 5243 of the memory 524. In contrast to the writing process as described in FIG. 7, during the reading process, the first applied voltage $V_{cc1}$ applied to the memory 524 is configured to be a maximum voltage allowable to power the memory 524, for example 3.3V, in order to increase the high-level output voltage $V_{oh}$ of the memory 524, for example 2.31V. However, a higher high-level output voltage $V_{oh}$ of the memory 524 will result in high leakage current. By using the first ADC 602 on the node A, the microcontroller of the in-circuit programmer 500 can verify the real output voltage level of the high-level output voltage $V_{oh}$ of the memory 524 and reduce the power supply $V_{cc3}$ of the input level shifter 506 to reduce the high-level input voltage $V_{ih}$ requirements of the in-circuit programmer 500. This will ensure that the input level shifter 506 of the in-circuit programmer 500 can decode even weak high-level output signals Voh from the memory 524. If the high-level output signals $V_{oh}$ of the memory 524 is much higher than the high-level input signals $V_{ih}$ of the in-circuit programmer 500, then the microcontroller of the in-circuit programmer 500 can decrease the power supply $V_{cc1}$ of the memory 524 to reduce the high-level output $V_{oh}$ of the memory 524 and reduce the current leakage $I_1$ through the second RC filter bank 604. To prevent current leakage $I_1$ through the ESD Diode $D_{71}$ of the bus controller 540, the microcontroller of the in-circuit programmer 500 will turn on the switch $Q_2$ to let the Node B at 0V and all the leakage current $I_1$ will be delivered to the in-circuit programmer Ground (GND) through the switch $Q_2$. Hence, the leakage current $I_1$ will be detoured to flow through the leakage current discharging circuit 508 instead of the ESD diodes $D_{71}$ thereby protecting the bus controller 540 from being damaged by the leakage current I1. The output buffer 502 of the in-circuit programmer 500 is not shown in FIG. 8 for simplicity.

Figure 9:
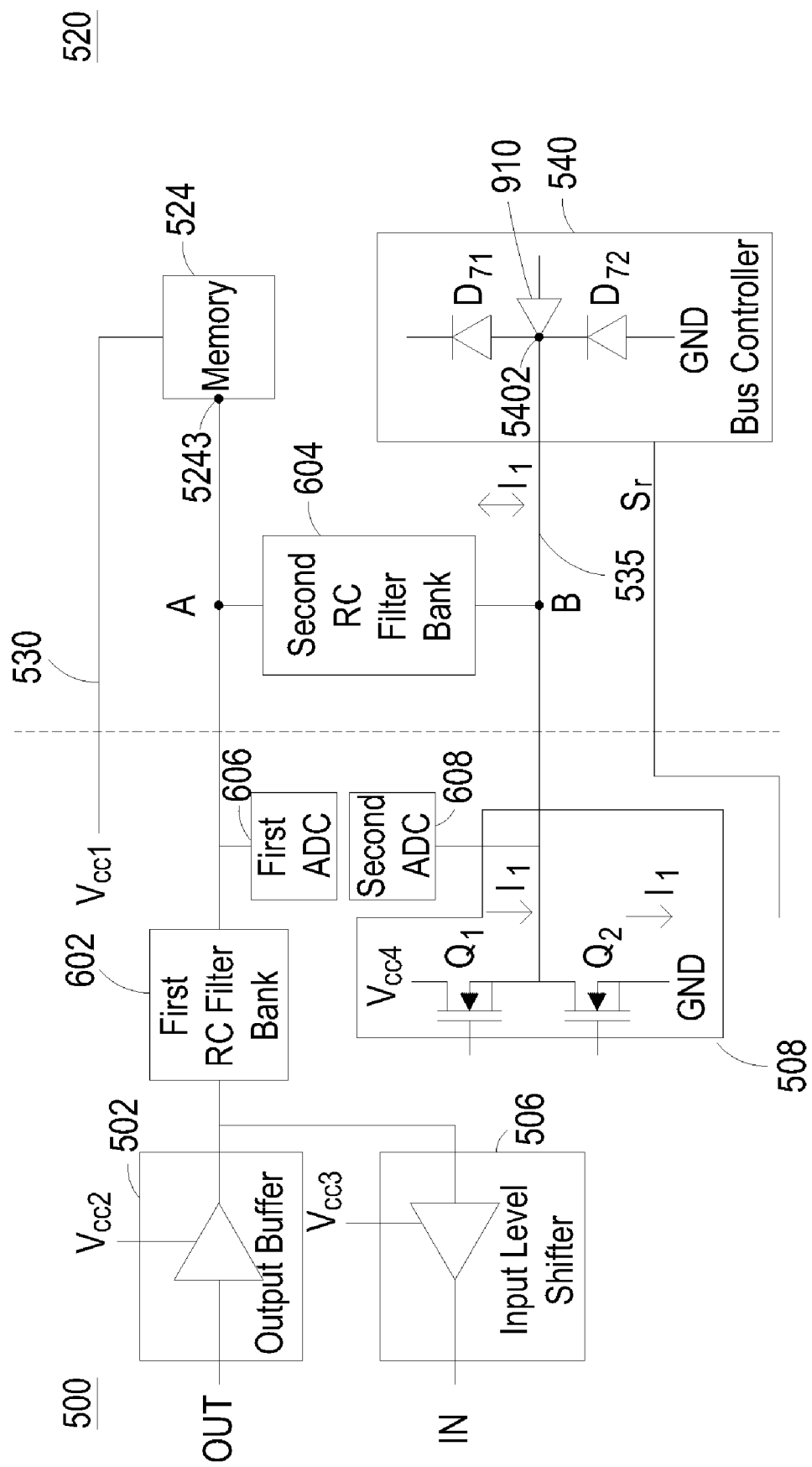

FIG. 9 is a system block diagram of the inventive in-circuit programming system for depicting the programming operation when the application board is powered on. As shown in FIG. 9, the in-circuit programmer 500 will issue a reset signal Sr to the bus controller 540 to stop the communication between the bus controller 540 and the memory 524 and fix a stable level on the I/O pin 5402 of the bus controller 540. If the I/O pin 5402 of the bus controller 540 are driven in high impedance, then the in-circuit programmer 500 will not have any problem to communicate with the memory 540. This can be easily measured by checking whether the leakage current through the serial resistor of the first RC filter bank 602 with the difference of voltage between power Vcc2 and the measured voltage by the first ADC 606. If there is no current, then in-circuit programmer 500 knows that the I/O pin 5402 of the bus controller 540 is in high Impedance. Under the reset state, the I/O pin 5402 of the bus controller 540 can be also driven in low impedance. The voltage level of the I/O pin 5402 can be either low or high according to the output buffer 910 and will be fixed during the phase of the reset. The in-circuit programmer 500 can therefore use the second ADC 608 connected to the node B in order to measure the voltage level of the I/O pin 5402 of the bus controller 540. The in-circuit programmer 500 will drive either the first switch $Q_1$, if the voltage level of the I/O pin 5402 of the bus controller 540 is high, or the second switch $Q_2$, if the voltage level of the I/O pin 5402 of the bus controller 540 is low. When the I/O pin 5243 of the memory 524 or the I/O pin of the output buffer 502 of the in-circuit programmer 500 outputs a high-level output signal at the node A and the I/O pin 5402 of the bus controller 540 outputs a low-level output signal at the node B, a large leakage current $I_1$ is induced and flows through the second switch $Q_2$. When the I/O pin 5243 of the memory 524 or I/O pin of the output buffer 502 of the in-circuit programmer 500 outputs a low-level output signal at the node A and the I/O pin 5402 of the bus controller 540 outputs a high-level output signal at the node B, the leakage current $I_1$ is induced and flows through the first switch $Q_1$ into the in-circuit programmer 500 or the memory 524. By using the leakage current discharging circuit 508, the leakage current $I_1$ can be prevented from injecting into the bus controller 540 to damage the bus controller 540.

In summary, the in-circuit programming system according to the invention is featured by providing a leakage current discharging circuit in the in-circuit programmer for discharging the leakage current induced during the programming process, thereby preventing the leakage current from injecting into the bus controller on the application board to damage the bus controller. Furthermore, the in-circuit programmer includes an input level shifter for receiving input data signals and ensuring that the high-level output voltage $V_{oh}$ of the memory is higher than the high-level input voltage $V_{il}$ of the in-circuit programmer. Also, the in-circuit programmer is configured to adjust the memory power supply in order to optimize the high-level input voltage $V_{ih}$ requirements according to the capability (i.e. the voltage level of the high-level output voltage $V_{oh}$) of the in-circuit programmer, to optimize the memory power supply for the internal programming and to minimize the current leakage. Eventually, the output buffer of the in-circuit programmer is configured to possess a strong driving capability in order to provide a sufficient high-level output voltage $V_{oh}$ of the in-circuit programmer. Thus, the inventive in-circuit programmer is able to eliminate the leakage current and save the cost of the application board, and render an efficient and reliable memory programming operation.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. An isolation-free in-circuit programming system, comprising:
   an in-circuit programmer; and
   an application board connected to the in-circuit programmer through a peripheral interface bus and having a bus controller and a memory, wherein the bus controller is connected to the memory through a system bus;
   wherein the in-circuit programmer includes a leakage current discharging circuit connected to the bus controller for detouring a leakage current flowing from the memory or the in-circuit programmer to the bus controller to flow therethrough.

2. The isolation-free in-circuit programming system according to claim 1 wherein the in-circuit programmer further includes an output buffer for outputting data signals to be written into the memory, and the output buffer possesses a driving capability sufficient to drive the in-circuit programmer to accomplish writing operations to the memory and the leakage current flows from the output buffer of the in-circuit programmer to the leakage current discharging circuit.

3. The isolation-free in-circuit programming system according to claim 1 wherein the in-circuit programmer further includes an input level shifter for receiving data signals from the memory, and wherein the input level shifter is configured to adjust the high-level input voltage requirements of the in-circuit programmer to decode a relatively weak high-level output voltage of the memory.

4. The isolation-free in-circuit programming system according to claim 3 wherein the in-circuit programmer further comprises a microcontroller configured to adjust a memory power supply to optimize a high-level input voltage requirement of the memory and a high-level output voltage of the memory.

5. The isolation-free in-circuit programming system according to claim 4 wherein the in-circuit programmer further comprises at least one analog-to-digital converter for measuring the magnitude of a high-level output voltage of the in-circuit programmer or the memory, and the microcontroller is configured to adjust the memory power supply to optimize the high-level input voltage requirement of the memory and the high-level output voltage of the memory according to the measured results of the analog-to-digital converter.

6. The isolation-free in-circuit programming system according to claim 4 wherein the in-circuit programmer further comprises at least one analog-to-digital converter for measuring the magnitude of a high-level output voltage of the in-circuit programmer or the memory, and the microcontroller is configured to adjust the high-level input voltage requirement of the in-circuit programmer according to the measured results of the analog-to-digital converter.

7. The isolation-free in-circuit programming system according to claim 4 wherein the in-circuit programmer further comprises at least one analog-to-digital converter for measuring the magnitude of an voltage on an I/O pin of the bus controller, and the microcontroller is configured to control a switching operation of the leakage current discharging circuit.

8. The isolation-free in-circuit programming system according to claim 1 wherein the leakage current discharging circuit includes a first switch connected between an I/O pin of the bus controller and an in-circuit programmer ground, and when the first switch is turned on, the leakage current passes through the first switch.

9. The isolation-free in-circuit programming system according to claim 8 wherein the leakage current discharging circuit further comprises a second switch connected to the first switch, and when the second switch is turned on, the leakage current passes through the second switch.

10. An isolation-free in-circuit programmer, connected to an application board through a peripheral interface bus, wherein the application board has a bus controller and a memory and the bus controller is connected to the memory through a system bus, the in-circuit programmer comprising:
    a microcontroller configured to adjust a memory power supply to optimize a high-level input voltage requirement of the memory of the application board and a high-level output voltage of the memory of the application board; and
    a leakage current discharging circuit controlled by the microcontroller and connected to the bus controller of the application board for detouring a leakage current flowing from the memory of the application board or the in-circuit programmer to the bus controller of the application board to flow therethrough.

* * * * *